United States Patent
Janardhanan (10) Patent No.: US 9,590,903 B2
(45) Date of Patent: *Mar. 7, 2017

(54) SYSTEMS AND METHODS FOR OPTIMIZING LAYER THREE ROUTING IN AN INFORMATION HANDLING SYSTEM

(71) Applicant: DELL PRODUCTS L.P., Round Rock, TX (US)

(72) Inventor: Pathangi Narasimhan Janardhanan, Santa Clara, CA (US)

(73) Assignee: DELL PRODUCTS, L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/729,477

(22) Filed: Jun. 3, 2015

(65) Prior Publication Data

US 2015/0263950 A1  Sep. 17, 2015

Related U.S. Application Data

(63) Continuation of application No. 13/560,899, filed on Jul. 27, 2012, now Pat. No. 9,083,642.

(51) Int. Cl.
| | |
|---|---|
| *H04L 12/58* | (2006.01) |
| *H04L 12/741* | (2013.01) |
| *H04L 12/713* | (2013.01) |
| *H04L 12/707* | (2013.01) |
| *H04L 12/931* | (2013.01) |
| *H04L 12/46* | (2006.01) |

(52) U.S. Cl.
CPC .......... *H04L 45/74* (2013.01); *H04L 12/4641* (2013.01); *H04L 45/24* (2013.01); *H04L 45/586* (2013.01); *H04L 49/356* (2013.01); *H04L 49/70* (2013.01)

(58) Field of Classification Search
CPC ............ H04L 12/4625; H04L 12/4675; H04L 12/4679; H04L 45/583; H04L 49/70
USPC ......................................... 370/235, 390, 399
See application file for complete search history.

(56) References Cited

U.S. PATENT DOCUMENTS

| | | | |
|---|---|---|---|
| 2002/0046271 A1 | 4/2002 | Huang | |
| 2008/0186968 A1 | 8/2008 | Farinacci et al. | |
| 2010/0189117 A1* | 7/2010 | Gowda | H04L 12/66 370/401 |
| 2010/0306408 A1 | 12/2010 | Greenberg et al. | |
| 2011/0116509 A1 | 5/2011 | Moreno et al. | |
| 2012/0110164 A1 | 5/2012 | Frey et al. | |
| 2013/0301642 A1 | 11/2013 | Radhakrishnan et al. | |
| 2014/0029412 A1 | 1/2014 | Janardhanan | |

* cited by examiner

*Primary Examiner* — Man Phan
*Assistant Examiner* — Ryan Kavleski
(74) *Attorney, Agent, or Firm* — Haynes & Boone, LLP (57) ABSTRACT

An information handling system is provided. The information handling system includes systems and methods for providing an anycast MAC addressing of a virtual redundancy router protocol instance that spans a plurality of aggregation switches. The anycast MAC address may be provided by a virtual bridging device and then used as an address of a virtual IP instance accessible through the virtual bridging device. Using the anycast MAC address with the virtual IP instance, a packet to be routed from one rack to another rack in a data center may be dynamically routed based a current load distribution.

20 Claims, 4 Drawing Sheets

SYSTEMS AND METHODS FOR OPTIMIZING LAYER THREE ROUTING IN AN INFORMATION HANDLING SYSTEM

CROSS REFERENCE TO RELATED APPLICATIONS

This application is a continuation of U.S. patent application Ser. No. 13/560,899 filed on Jul. 27, 2012, the full disclosure of which is incorporated by reference herein in its entirety and for all purposes.

BACKGROUND

1. Technical Field

The present disclosure is related to information handling systems. In particular, embodiments disclosed herein are related to layer three routing in a TRILL network.\

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems, such those in a data center may include racked servers coupled to aggregation switches. In some circumstances traffic may need to flow from one virtual local area network (VLAN) on one rack to a different VLAN on the same rack or a different rack. While it may be advantageous to dynamically adjust the load distribution across the network, this may be difficult to achieve. What is needed is a method for incorporating such dynamic load distribution mechanisms into such a network.

SUMMARY

Consistent with some embodiments, there is provided an information handling system. The information handling system may include a plurality of racks of servers, each of the plurality having a top-of-rack switch with each top-of-rack switch configured to provide a bridging device. The information handling system may also include a plurality of aggregation switches, with each aggregation switch being coupled to each of the top-of-rack switches and each aggregation switch also configured to provide a bridging device. The information handling system may further include a virtual bridging device acting in communication with the plurality of aggregation switches.

Consistent with some embodiments, there is further provided a method for optimizing layer three routing by creating an anycast MAC addressed virtual router in an information handling system. The method may include receiving a packet from a source top-of-rack switch at an aggregation switch and detecting a virtual IP MAC address in the packet. The virtual IP MAC address may be associated with a virtual IP instance and a virtual routing bridge, with a virtual routing bridge identifier being included in a header of the packet as an egress routing bridge address of the packet. The method may further include recognizing that the aggregation switch and the virtual routing bridge are neighbors in the network, decapsulating the packet, and routing the packet to a destination top-of-rack switch.

Other embodiments may provide another method for optimizing layer three routing by creating an anycast MAC and IP addressed virtual router in an information handling system. The method may include receiving a packet at a top-of-rack switch from a server coupled to the top-of-rack switch, the packet having a destination MAC address that is the anycast MAC address of a virtual router and recognizing that the destination MAC address is associated with the virtual router, the virtual router being reachable through the a plurality of aggregation switches. The method may also include encapsulating the packet with an identifier of a virtual routing bridge as an egress routing bridge address in a header of the packet and forwarding the packet to one of a plurality of aggregation switches that provide the virtual routing bridge. The virtual routing bridge may share a MAC address with a virtual router.

These and other embodiments will be described in further detail below with respect to the following figures.

BRIEF DESCRIPTION OF THE DRAWINGS

In the drawings, elements having the same designation have the same or similar functions. The drawings may be better understood when viewed in connection with the following detailed description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
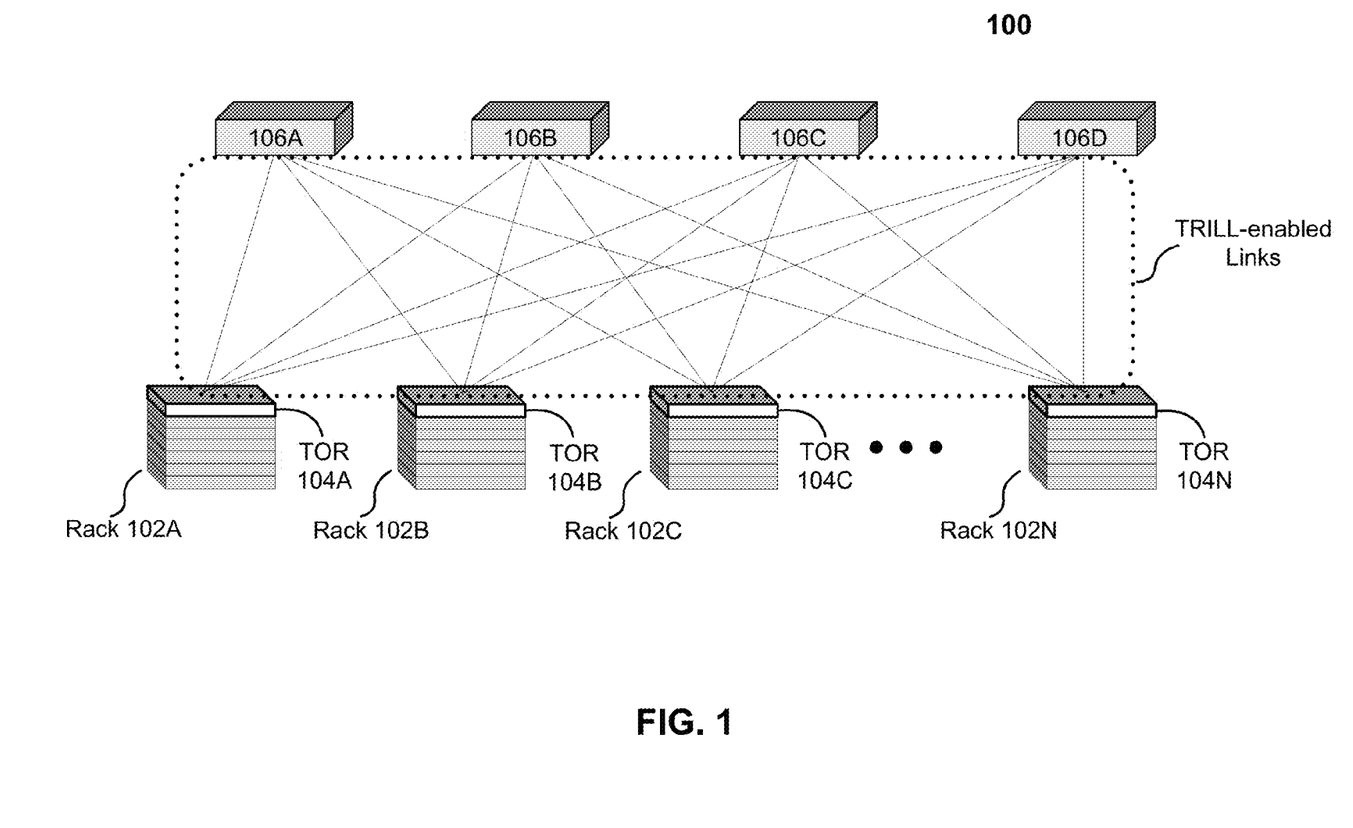
FIG. 1 depicts an information handling system composed of server racks and aggregation switches coupled in a network.

FIG. 1 shows an information handling system with a network 100 such as might be used in a data center. Network 100 may include a plurality of racks 102A-N, and each rack, like rack 102A, may include a plurality of servers and one of a plurality of switches, such as top-of-rack switches (TORs) 104A-N, like TOR 104A. Each of the TORs 104A-N may be layer-two devices capable of implementing various networking protocols, including the Transparent Interconnect of Lots of Links (TRILL) networking protocol, which is a protocol defined by the Internet Engineering Task Force. TRILL allows layer 2 link state routing. Additionally, each of TORs 104A-N may act as a bridging device, and in some embodiments, TORs 104A-N may act as routing bridge devices (RBridges), which are devices that may implement a TRILL network. TORs 104A-N may provide for intra-rack switching.

Additionally, network 100 may include a plurality of aggregation switches. FIG. 1 also depicts four aggregation switches 106A-D. Aggregation switches 106A-D are layer three devices that may provide for routing between the different virtual local area networks (VLANs) within a single rack or between racks 102A-N. Generally, layer three routing is performed by an aggregation switch that receives a packet having an Ethernet header. The aggregation switch may remove that outer Ethernet header to examine the packet's IP header, which includes an internet protocol (IP) destination address. The aggregation switch may route the packet based on the IP destination address, after placing the packet in a new Ethernet header. Additionally, aggregation switches 106A-D may also be configured to act as RBridges with respect to network 100 and thus may act as layer two devices as well as layer three devices.

When two hosts in the same VLAN are communicating at layer two, the communications may be switched at a TOR if both hosts are in the same rack, or they may be switched at the layer of aggregation switches. Generally, layer two switching is performed by a switch that examines the Ethernet header of a packet and the media access control (MAC) destination address. Based on the MAC destination address, the layer two switch will forward the packet to a port towards the destination without changing the packet, as occurs in layer three routing.

When two hosts in different VLANs, i.e. different subnets, want to communicate with each other, either in the same rack or across different racks, the communications may be routed at the aggregation switch layer. A number of communication links are also depicted in FIG. 1. The communication links connect each of the aggregation switches 106A-D to each of the TORs 104A-N. These communications links may allow data to be transmitted according to various network protocols. In some embodiments, the communications links may be TRILL-enabled links supporting the TRILL protocol.

As indicated, aggregation switches 106A-D may facilitate routing between the racks 102A-N. Network 100 may include a number of VLANs in a variety of configurations. For example, a first VLAN may be present on a server or servers in rack 102A. Or, the first VLAN may include servers on racks 102A and 102C. Other VLANS may exist in network 100 on the servers on these racks or on other racks. For example, the first VLAN may be present on servers in racks 102A and 102C and a second VLAN may be present on rack 102B.

In such configurations, a first VLAN server (a server that is part of the first VLAN) on rack 102A may need to communicate with a first VLAN server on rack 102C. This may be done when the rack 102A first VLAN server sends a packet to the TOR 104A on rack 102A. TOR 104A may recognize from a destination MAC address that the packet is to be sent to rack 102C and may encapsulate the packet with an identifier for TOR 104C as the egress RBridge address and an identifier for TOR 104A as the ingress RBridge address in the packet's header. As part of the TRILL protocol, when a packet enters the TRILL network at an RBridge, the packet is encapsulated with a TRILL header. The TRILL header contains an identifier of the RBridge by which the packet entered the TRILL network, called the ingress RBridge address, and also an identifier of the RBridge by which the packet should exit the TRILL network, called the egress RBridge address. For the encapsulated packet to reach TOR 104C from TOR 104A, the packet may be forwarded to one of aggregation switches 106A-D. The determination as to which of aggregation switches 106A-D receives the packet may be made in a variety of ways.

However, when a server from the first VLAN needs to communicate with a server on the second VLAN, the packets may be routed based on layer three internet protocol (IP) routing. In such circumstances, the server may direct all packets to a specific aggregation switch, such as aggregation switch 102A. To provide static load balancing capabilities, multiple virtual IP instances may be used. In some embodiments, the virtual IP instances may be virtual redundancy router protocol (VRRP) instances. A first virtual IP instance may be deployed on aggregation switch 106A, while a second virtual IP instance may be deployed on aggregation switch 106B. Some of the first VLAN servers on rack 102A may be configured to communicate with the first virtual IP instance, while other first VLAN servers on rack 102A may be configured to communicate with the second virtual IP instance. Thus, in order to load balance communications between the first VLAN servers on rack 102A and the second VLAN servers on rack 102B, some servers on rack 102A may direct some packets to be routed through aggregation switch 106A and others through aggregation switch 106B.

Figure 2:
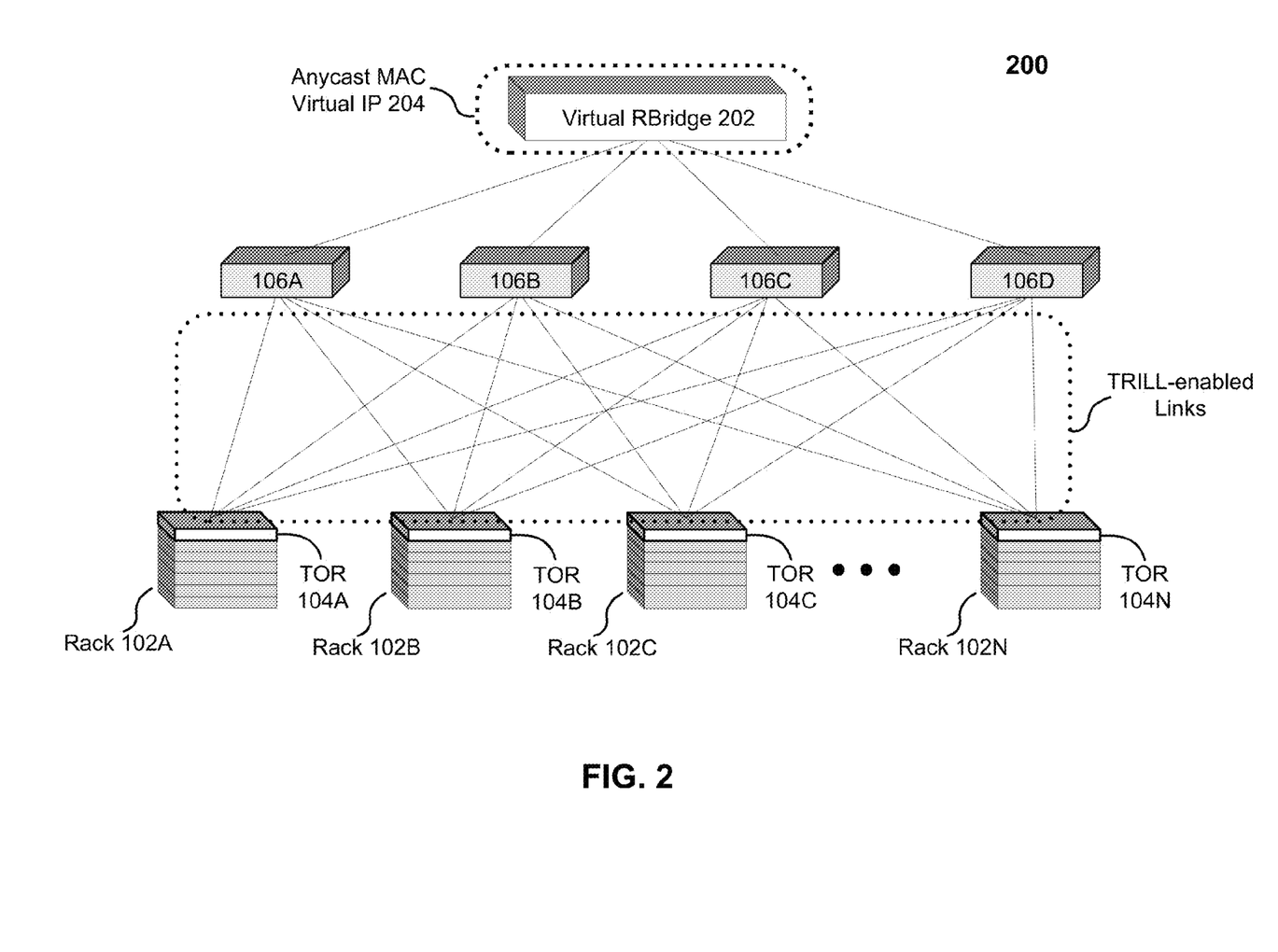
FIG. 2 depicts an information handling system composed of coupled server racks and aggregation switches and a virtual routing bridge logically behind the aggregation switches.

FIG. 2 depicts a network 200 that is similar in many respects to network 100 of FIG. 1. Network 200 may further include a virtual bridging device 202. In embodiments implementing the TRILL protocol, virtual bridging device 202 may be a virtual routing bridge device, virtual RBridge 202. Virtual RBridge 202 may be implemented largely as discussed in U.S. patent application Ser. No. 13/560,885, filed on Jul. 27, 2012, titled "Systems and Methods for Providing Anycast MAC Addressing in an Information Handling System" and published as U.S. Pat. App. Pub. No. 2014/0029412, the disclosure of which is incorporated herein in its entirety. Thus, virtual RBridge 202 may be a logical entity rather than a physical entity. Logically, the topology of network 200 may appear as depicted, with virtual RBridge 202 located behind the aggregation switches 106A-D relative to the racks 102A-N. A virtual RBridge identifier may be used to indicate virtual RBridge 202 as an egress or ingress RBridge address in TRILL headers as encapsulated packets move around in the network. However, traffic cannot be forwarded through virtual RBridge 202, since it does not physically exist. Aggregation switches 106A-D are configured so as to provide the functions of a virtual RBridge by receiving, decapsulating, encapsulating, and forwarding packets as if those actions were performed by the particular virtual RBridge. Thus the computer processor and other hardware of aggregation switches 106A-D, and any non-transitory computer readable medium containing computer instructions being executed by the processor, may handle data on behalf of the virtual RBridge.

Virtual RBridge 202 is associated with a specific MAC address, referred to as an anycast MAC address. Virtual RBridge 202 can provide a MAC address that has anycast capabilities. For example, at layer two in network 200, a packet with the anycast MAC address associated with virtual RBridge 202 may be encapsulated by TOR 104A, using an identifier of virtual RBridge 202 as the egress MAC address. The packet may be forwarded to any one of aggregation switches 106A-D, since they all appear in the topology of network 200 as neighbors of virtual RBridge 202 and are all configured to act on behalf of virtual RBridge 202. The RBridge of the receiving aggregation switch may decapsulate the packet, perform routing functions and determine its destination, re-encapsulate it with the virtual RBridge identifier as its ingress RBridge address, and forward it toward its destination on behalf of virtual RBridge 202.

Additionally, FIG. 2 depicts an anycast MAC virtual IP instance 204. Anycast MAC virtual IP instance 204 is a single virtual IP instance running on a plurality of aggregation switches, such as aggregation switches 106A-D. The single virtual IP instance may be associated with a specific IP address which may be a default gateway for a particular VLAN, and may be a VRRP instance. Anycast MAC virtual IP instance 204 may act as a single virtual router for all of the aggregation switches 106A-D. In practice, anycast MAC virtual IP instance 204 may function as follows. A server associated with a first VLAN on rack 102A may need to communicate with a server on a second VLAN on rack 102B. The server on rack 102A may perform address resolution protocol (ARP) resolution on its default gateway IP address, which may be broadcast to aggregation switches 106A-D.

One of aggregation switches 106A-D may respond with the corresponding anycast MAC address of anycast MAC virtual IP instance 204 that belongs to the gateway IP address. The server on rack 102A may send a packet to TOR 104A, TOR 104A may recognize that the packet has the anycast MAC address associated with anycast MAC virtual IP instance 204 and provided by virtual RBridge 202. TOR 104A may also recognize that the anycast MAC address is associated with virtual RBridge 202, and may encapsulate the packet with an identifier for virtual RBridge 202 as the egress MAC address of the packet. Thus, the anycast MAC virtual IP instance 204 may appear to be logically located behind the aggregation switches 106A-D and appear to be running on the virtual RBridge 202. Just as with virtual RBridge 202, anycast MAC virtual IP instance 204 may be provided functionally by aggregation switches 106A-D.

TOR 104A may recognize virtual RBridge 202 as behind all of aggregation switches 106A-D, and also that aggregation switches 106A-D are equidistant. Thus, another forwarding decision criterion may be used to decide to which aggregation switch to forward a packet. TOR 104A may use a hashing algorithm with equal-cost multipathing and link aggregation to select which among aggregation switches 106A-D to receive the encapsulated packet. For example, TOR 104A may select aggregation switch 106D, to which it will then forward the packet.

Upon receipt of the packet, aggregation switch 106D may recognize that the egress RBridge address in the header of the encapsulated packet is the identifier of virtual RBridge 202. Aggregation switch 106D may recognize that it neighbors virtual RBridge 202 in the topology of network 200. Aggregation switch 106D may then decapsulate the packet on behalf of virtual RBridge 202. After decapsulation, aggregation switch 106D may determine that the destination MAC address of the packet is the anycast MAC address associated with anycast MAC virtual IP instance 204. As stated, anycast MAC virtual IP instance 204 is configured as the virtual IP instance for aggregation switch 106D (as well as aggregation switches 106A-C) and may be a VRRP instance. Aggregation switch 106D may then determine that the packet's ultimate destination is the server on the second VLAN on rack 102B. Aggregation switch 106D may then route the packet to TOR 104B, which will then convey the packet to the destination server.

In order for the network 200 to function properly, address resolution protocol requests and responses may be handled in a modified fashion. The following example is provided in order to explain how this may be accomplished. A first server on rack 102A may need to communicate with a second server on rack 102C. For typical routing, the servers may all be configured to use a default gateway which may be provided by the virtual RBridge using the same anycast MAC address as anycast MAC virtual IP instance 204. The first server may send out an ARP packet to the default gateway. The packet may be a broadcast packet, and thus may reach all of aggregation switches 106A-D. Since each of the aggregation switches can perform the routing functions of the default gateway, and each may receive the broadcast ARP packet, all aggregation switches 106A-D may recognize the ARP request. However, one of aggregation switches 106A-D may be designated as an ARP master aggregation switch. And only the ARP master aggregation switch may respond to the ARP request on behalf of the default IP gateway address.

The ARP master aggregation switch may send an ARP response to TOR 104A on rack 102A, where the first server that initiated the ARP request is located. When the first server receives the ARP response, it will learn of the anycast MAC virtual IP instance 204 as the MAC address of its default IP gateway. The first server may then attempt to transmit a regular packet to the anycast MAC virtual IP instance 204. TOR 104A may then associate the anycast MAC address as being provided by virtual RBridge 202. Similarly, all the servers on rack 102A may be configured to point to the virtual IP instance as the default gateway for layer three routing. Some embodiments of network 200 may include more than one anycast MAC virtual IP. In such embodiments, each VLAN may have an anycast MAC address and an IP address for its respective anycast MAC virtual IP. The IP address may be configured through dynamic host configuration protocol (DHCP) or other such means. Each anycast MAC virtual IP instance may designate one of the plurality of aggregation devices as its ARP master aggregation switch. Additionally, a single virtual RBridge, such as virtual RBridge 202, may provide a plurality of anycast MAC virtual IP instances. In such embodiments, the virtual RBridge may provide an anycast IP address and an anycast MAC address for each anycast MAC virtual IP provided by the virtual RBridge.

Figure 3:
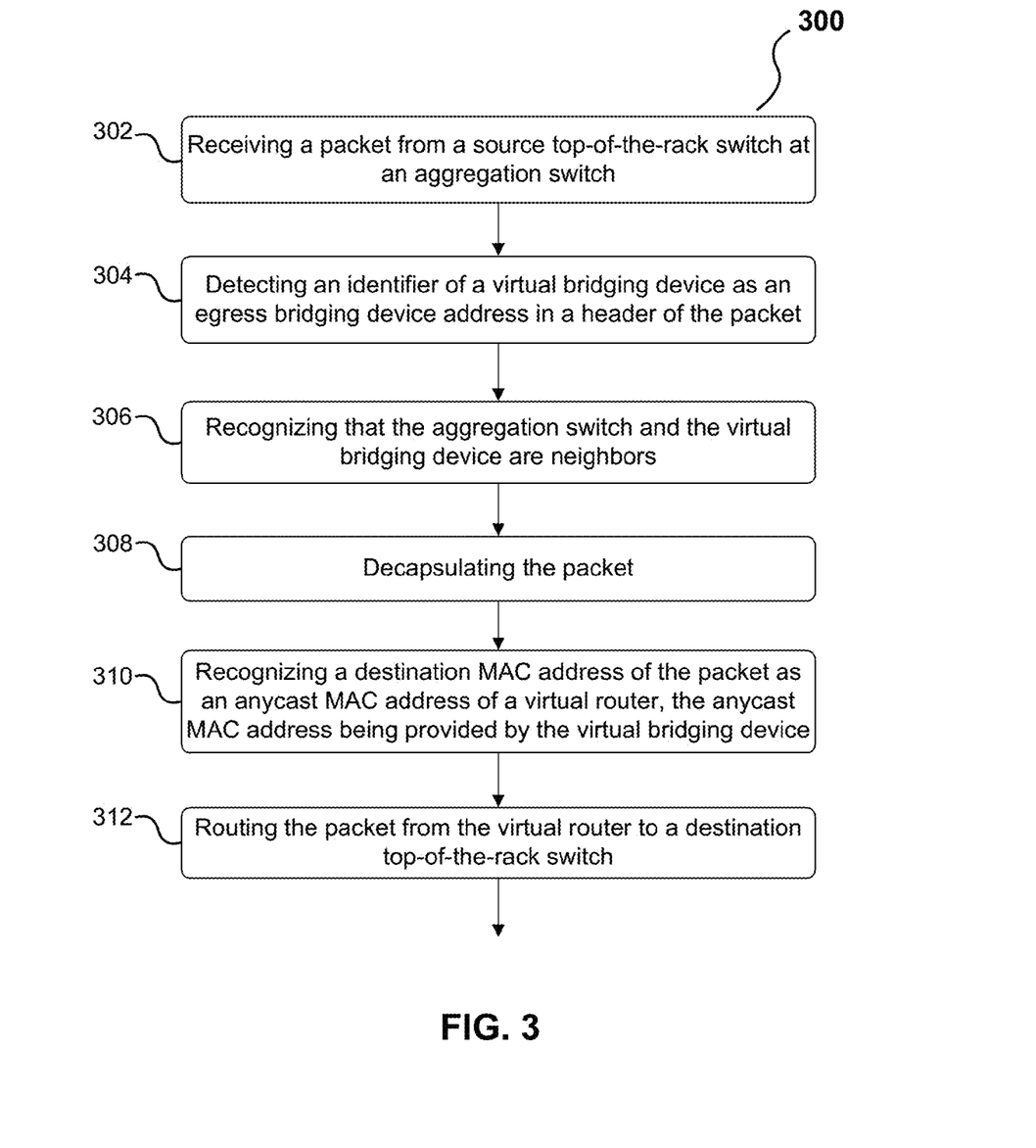
FIG. 3 is a flowchart of a method improving layer three routing by incorporating an anycast MAC addressed virtual IP into a network.

FIG. 3 shows a flowchart of a method 300 for optimizing layer three routing over a network. Method 300 may operate on a network such as network 100 of FIG. 1 to create a network 200 as depicted in FIG. 2; such a network may be a TRILL network. Method 300 may begin in step 302, when an aggregation switch, such as aggregation switch 106A, receives a packet from a source TOR, such as TOR 104A. The aggregation switch may detect an identifier of a virtual bridging device, such as virtual RBridge 202, in the packet as being an egress RBridge address of the packet, in step 304. The aggregation switch may be configured with RBridge capabilities, and may recognize that it neighbors the virtual bridging device, in step 306, and decapsulate the packet, in step 308. Method 300 may continue in step 310 when the aggregation switch recognizes an anycast MAC address of an anycast MAC virtual IP and may present it to the anycast MAC virtual IP instance on the aggregation switch. Anycast MAC virtual IP may determine the destination server of the packet and may encapsulated the packet with the egress RBridge of the TOR associated with the determination server. In step 312, anycast MAC virtual IP may route the packet to a destination top-of-the-rack switch.

To further clarify this disclosure, an example of how method 300 may be performed on network 200 of FIG. 2 follows. A source server that is part of a source VLAN on rack 102A may have a packet to send to a destination server that is part of a destination VLAN on rack 104B. This packet may be sent from the source server to TOR 104A, which may transmit the packet across the TRILL enabled links to any one of aggregation switches 106A-D, for example aggregation switch 106C. The packet may be encapsulated with a TRILL header that includes an identifier of virtual RBridge 202 as the egress RBridge address of the packet. Aggregation switch 106C may receive the packet from TOR 104A (step 302). Aggregation switch 106C, acting as an RBridge, may determine that the egress RBridge address of the packet is virtual RBridge 202 (step 304).

When aggregation switch 106C recognizes that it neighbors virtual RBridge 202 in the topology of network 200 (step 306), aggregation switch 106C may decapsulate the packet on behalf of virtual RBridge 202 (step 308). Aggregation switch 106C may recognize that the packet contains the anycast MAC address of anycast MAC virtual IP instance 204 and present the packet to the routing instance identified by anycast MAC virtual IP instance 204 (step 310). Anycast MAC virtual IP instance 204 may be a VRRP instance running on aggregation switches 106A-D, and thus accessible at any of those aggregation switches. The routing instance of anycast MAC virtual IP instance 204 may determine the destination server of the packet. The packet may then be encapsulated by aggregation switch 106C with the egress RBridge of the TOR 104B as the destination server. Aggregation switch 106C may then route the packet to TOR 104B on rack 102B (step 312), for example, by re-encapsulating the packet for transmission of the TRILL-enabled links with TOR 104B as the egress RBridge address in the TRILL header of the packet.

Figure 4:
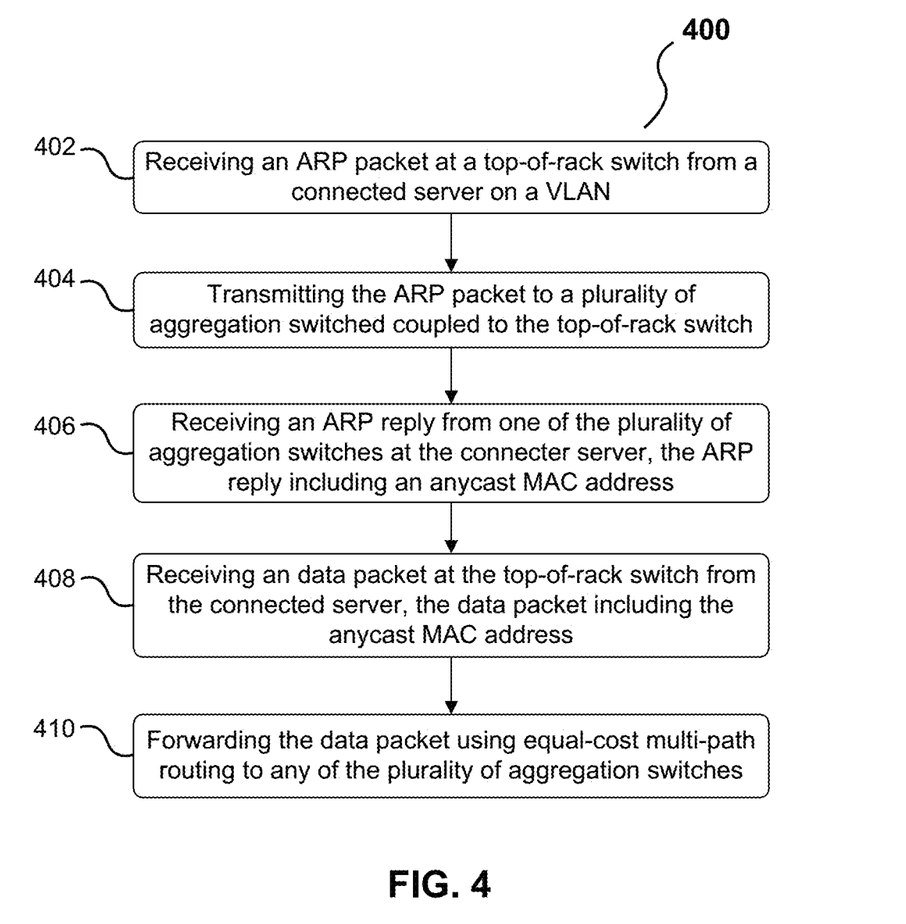
FIG. 4 is a flowchart of another method improving layer three routing by incorporating an anycast MAC addressed virtual IP into a network.

FIG. 4 is a flowchart of a method 400 for optimizing layer three routing over a network. Like method 300 of FIG. 3, method 400 may operate on a network such as network 100 of FIG. 1 to provide a network like network 200 of FIG. 2. Method 400 may begin in step 402 when a TOR receives an ARP packet from a coupled server that is part of a particular VLAN. In step 404, the TOR may transmit the ARP packet to a plurality of aggregation switches coupled to the TOR. Thus, the TOR may flood the ARP packet to the aggregation switches. In step 406, the coupled server may receive an ARP reply from one of the plurality of aggregation switches. The ARP reply may include an anycast MAC address associated with a default gateway for the particular VLAN. In step 408, method 400 may continue when the TOR receives an encapsulated packet from the coupled server. The encapsulated packet may include the anycast MAC address as its destination address. Finally, in step 410, the TOR may forward the encapsulated packet using equal-cost multi-path (ECMP) routing or another similar technique to any of the plurality of aggregation switches. The particular aggregation switch to which the encapsulated packet may be sent may be determined by the ECMP routing.

For example, method 400 may operate in the following manner on network 200. TOR 104A may receive an ARP packet from a server A on rack 102A (step 402). Server A, which may be associated with a VLAN A, may need to communicate with a server B on VLAN B. Server A may send the ARP packet to TOR 104A so that TOR 104A may then flood the ARP packet to all the aggregation switches 106A-D and to the other TOR (step 404). All of the aggregation switches 106A-D may decapsulate the packet and thereby discovery that the packet is an ARP request requesting an IP address that is the default gateway for VLAN A.

As only one of aggregation switches 106A-D may be designated as the ARP master, only the ARP master aggregation switch (for discussion purposes aggregation switch 106D may be considered as the designated ARP master) may respond with an ARP reply. Aggregation switch 106D may transmit the ARP reply to TOR 104A, which may then transmit the ARP reply to server A (step 406). The ARP reply may contain the anycast MAC address associated with the default gateway on VLAN A and the anycast MAC virtual IP instance 204. The ingress RBridge for the ARP reply may be the virtual RBridge 202.

Server A may then encapsulate a data packet to transmit to server B using the anycast MAC address and send the data packet to TOR 104A (step 408). TOR 104A may recognize the anycast MAC address as belonging to virtual RBridge 202, and then may use ECMP to forward the encapsulated data packet to any one of aggregation devices 106A-D (step 410). Whichever of aggregation devices 106A-D receives the encapsulated data packet may then decapsulate it, route it, and then re-encapsulate the packet before sending it to server B on to the appropriate TOR.

In some embodiments, the virtual RBridge may be provided by the RBridge devices provided by one or more of TORs 104A-N. TORs 104A-D may be further configured to provide aggregation and routing services similar to those provided by aggregation switches 106A-D. The virtual RBridge may be used to provide an anycast MAC address and an anycast IP address for a virtual router. The virtual router may span one or more of TORs 104A-D, and in the topology of the network, the virtual RBridge and virtual router may appear behind TORs 104A-N instead of behind aggregation switches 106A-D. In some other embodiments, both aggregation switches 106A-D and TORs 104A-N may provide virtual RBridges that provide anycast MAC addresses for multiple virtual router instances as described above.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An apparatus comprising:
   an aggregation switch coupled to a plurality of switching devices;
   wherein the aggregation switch is configured to:
   receive an address resolution protocol (ARP) packet from a first one of the plurality of switching devices;
   transmit an ARP reply to the first one of the plurality of switching devices on behalf of a virtual bridging device being provided by the aggregation switch and one or more other aggregation switches, the ARP reply including a first anycast MAC address for the virtual bridging device;
   receive a first data packet from the first one of the plurality of switching devices, the first data packet including the first anycast MAC address as a destination MAC address; and
   forward the first data packet on behalf of the virtual bridging device;
   receive a second data packet from the plurality of switching devices, the second data packet including a second anycast MAC address as a second destination MAC address, the second anycast MAC address being an address for the virtual bridging device and being different from the first anycast MAC address; and
   forward the second data packet on behalf of the virtual bridging device.

2. The apparatus of claim 1, wherein to forward the first data packet the aggregation switch is further configured to:
   determine a destination IP address of the first data packet;
   select a second one of the plurality of switching devices based on the destination IP address; and
   forward the first data packet to the second one of the plurality of switching devices.

3. The apparatus of claim 2, wherein to forward the first data packet, the aggregation switch is further configured to:
   receive the first data packet on a first VLAN; and
   forward the first data packet to the second one of the plurality of switching devices on a second VLAN.

4. The apparatus of claim 1, wherein the aggregation switch is designated as an ARP master for the virtual bridging device.

5. The apparatus of claim 1, wherein the first anycast MAC address is a MAC address of a default routing gateway.

6. The apparatus of claim 1, wherein the virtual bridging device provides a virtual router instance.

7. A method of forwarding network traffic, the method comprising:
   receiving, by an aggregation switch, an address resolution protocol (ARP) packet from a first switching device coupled to the aggregation switch;
   transmitting, by the aggregation switch, an ARP reply to the first switching device on behalf of a virtual bridging device being provided by the aggregation switch and one or more other aggregation switches, the ARP reply including a first anycast MAC address for the virtual bridging device;
   receiving, by the aggregation switch, a first data packet from the first switching device, the first data packet including the first anycast MAC address as a first destination MAC address; and
   forwarding, by the aggregation switch, the first data packet on behalf of the virtual bridging device;
   receiving a second data packet from a second switching device, the second data packet including a second anycast MAC address as a second destination MAC address, the second anycast MAC address being an address for the virtual bridging device and being different from the first anycast MAC address; and
   forwarding the second data packet on behalf of the virtual bridging device.

8. The method of claim 7, wherein forwarding the first data packet comprises:
   determining, by the aggregation switch, a destination IP address of the first data packet;
   selecting, by the aggregation switch, a third switching device based on the destination IP address; and
   forwarding, by the aggregation switch, the first data packet to the third switching device.

9. The method of claim 8, wherein forwarding the first data packet further comprises:
   receiving, by the aggregation switch, the first data packet on a first VLAN; and
   forwarding, by the aggregation switch, the first data packet to the third switching device on a second VLAN.

10. The method of claim 7, wherein the aggregation switch is designated as an ARP master for the virtual bridging device.

11. The method of claim 7, wherein the first anycast MAC address is a MAC address of a default routing gateway.

12. The method of claim 7, wherein the virtual bridging device is a virtual router instance.

13. An information handling system, the system comprising:
   a plurality of aggregation switches coupled to a plurality of switching devices; and
   a virtual bridging device, the aggregation switches providing functionality for the virtual bridging device;
   wherein:
   the aggregation switches are configured to receive an address resolution protocol (ARP) packet from a first one of the plurality of switching devices;
   a first one of the aggregation switches is configured to transmit an ARP reply to the first one of the plurality of switching devices on behalf of the virtual bridging device, the ARP reply including a first anycast MAC address associated with the virtual bridging device; and
   the aggregation switches are further configured to:
   receive first data packets from the plurality of switching devices, the first data packets including the first anycast MAC address as a first destination MAC address;
   forward the first data packets on behalf of the virtual bridging device;
   receive second data packets from the plurality of switching devices, the second data packets including a second anycast MAC address as a second destination MAC address, the second anycast MAC address being an address for the virtual bridging device and being different from the first anycast MAC address; and forward the second data packets on behalf of the virtual bridging device.

14. The system of claim 13, wherein to forward the first data packets the aggregation switches are further configured to:

determine a respective destination IP address of each of the first data packets;

select a respective second one of the plurality of switching devices for each of the first data packets based on the respective destination IP address; and forward the first data packets to the respective second one of the plurality of switching devices.

15. The system of claim 14, wherein to forward a third data packet from the first data packets to a second one of the plurality of switching devices, the first one of the aggregation switches is further configured to:

receive the third data packet on a first VLAN; and forward the third data packet on a second VLAN.

16. The system of claim 13, wherein the first one of the aggregation switches is designated as an ARP master for the virtual bridging device.

17. The system of claim 13, wherein the first anycast MAC address is a MAC address of a default routing gateway.

18. The system of claim 13, wherein the virtual bridging device is a virtual router instance.

19. The system of claim 13, wherein the first and second anycast MAC addresses are associated with different VLANs.

20. The method of claim 7, wherein forwarding the first data packet includes encapsulating the first data packet with an identifier for the virtual bridging device as an egress MAC address of the first data packet.

* * * * *